United States Patent
Jacobi

[15] 3,654,043
[45] Apr. 4, 1972

[54] MOVABLE HEAT-SEALING APPARATUS

[72] Inventor: William I. Jacobi, 1108 Nevada St., Northfield, Minn. 55057

[22] Filed: Nov. 28, 1969

[21] Appl. No.: 880,864

[52] U.S. Cl..............................156/582, 156/380, 156/544
[51] Int. Cl....................................B32b 31/08, B29c 27/06
[58] Field of Search................156/582, 583, 380, 544, 545

[56] References Cited

UNITED STATES PATENTS

| | | | |
|---|---|---|---|
| 2,517,672 | 8/1950 | Jenkins | 156/380 |
| 3,065,121 | 11/1962 | Andrews | 156/544 X |
| 3,269,884 | 8/1966 | Slater | 156/545 |

Primary Examiner—Benjamin A. Borchelt
Assistant Examiner—J. J. Devitt
Attorney—J. Vincent Martin, Joe E. Edwards, M. H. Gay, Alfred H. Evans and Jack R. Springgate

[57] ABSTRACT

This patent relates to a machine for heat-sealing two sheets of material together while moving along a track. The machine is provided with heat-sealing wheels, a support for a sheet or material carried by the machine, an edge-guide assembly for guiding a second sheet of material external to the machine into position to be sealed to the sheet carried by the machine, supports for strips of material to be utilized in sealing, and means for laterally adjusting all such parts to align them with the external sheet.

4 Claims, 5 Drawing Figures

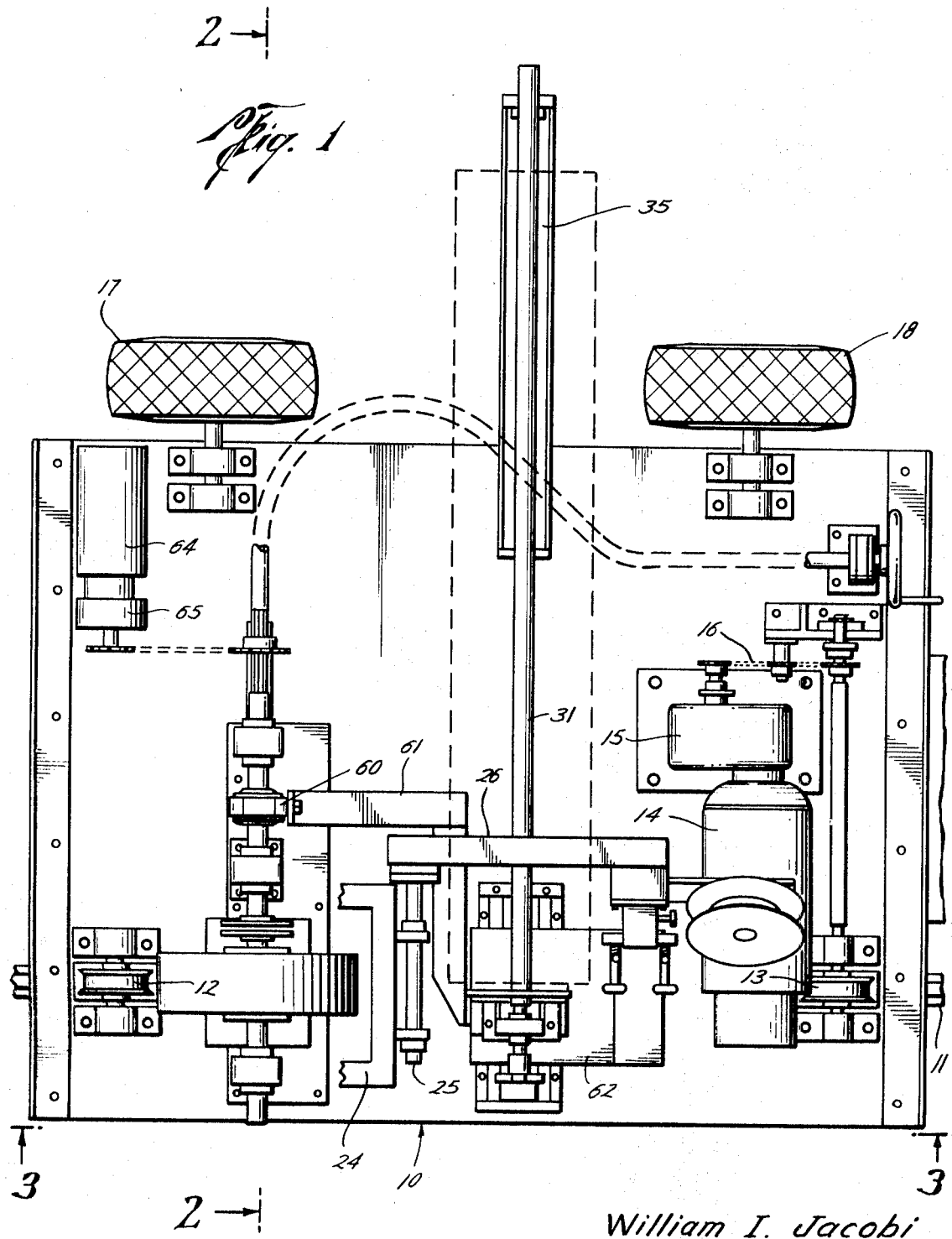

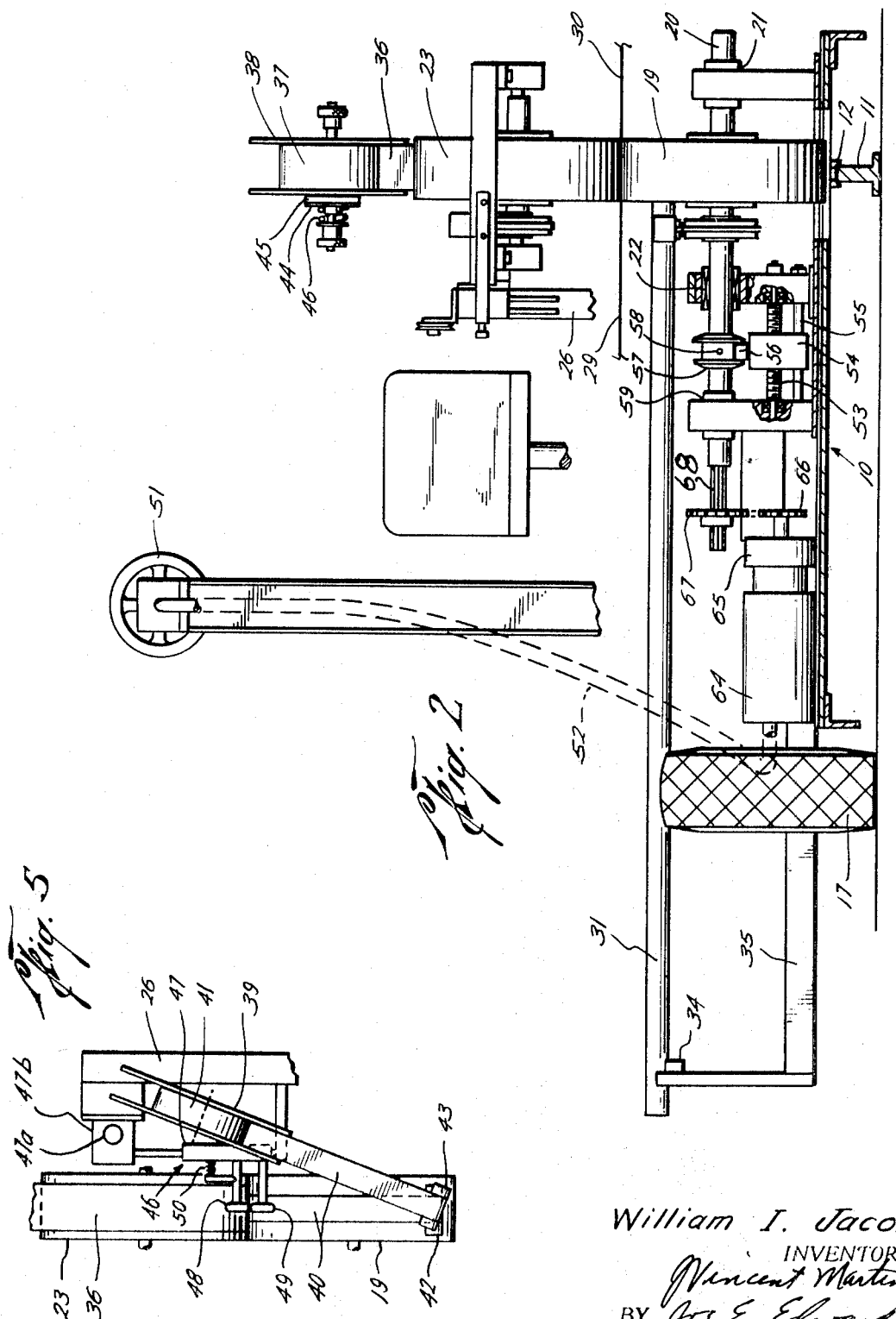

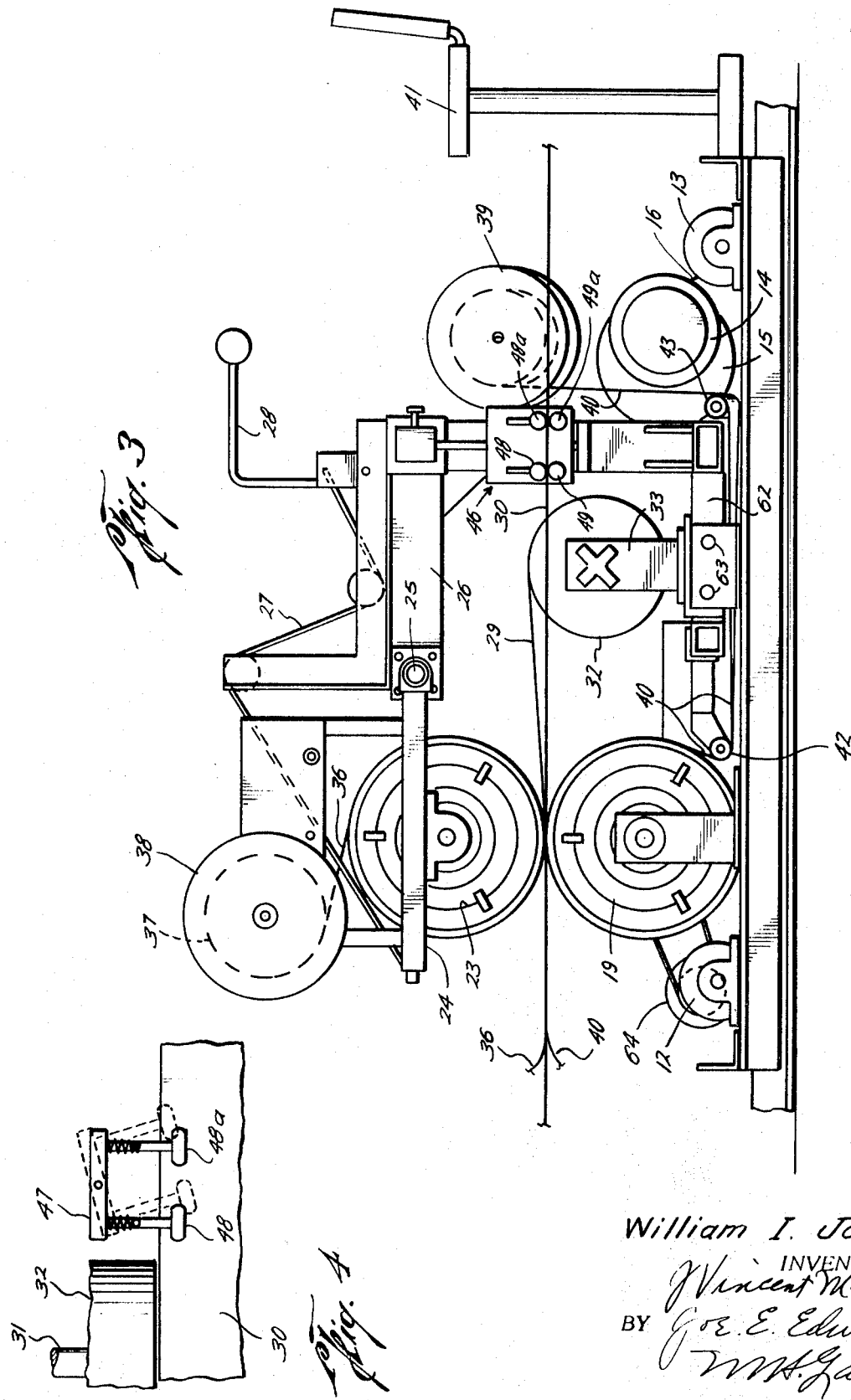

MOVABLE HEAT-SEALING APPARATUS

This invention relates to sealing apparatus for sealing a sheet of material to another sheet of material which may be in place in a vessel, such as a vessel for storing cryogenic liquids.

It is an object of this invention to provide a powered machine adapted to travel along a track, which machine has means for aligning and sealing together two sheets of material, one being carried by the machine and the other being external to the machine.

Another object is to provide a powered machine adapted to travel along a track, which machine carries a roll of material to be sealed to a sheet of material external to the machine and extending for a considerable distance, and which machine has means for lateral adjustment relative to the external sheet, so that the edges of the two sheets may be properly aligned as they pass between sealing wheels to be sealed together.

Another object is to provide a powered machine adapted to travel along a track, which machine carries a roll of material to be sealed to a sheet of material external to the machine and extending for a considerable distance, and which machine has means for lateral adjustment relative to the external sheet, as well as means for lateral adjustment of the external sheet relative to the machine, so that the edges of the two sheets may be properly aligned as they pass between sealing wheels to be sealed together.

A further object is to provide such a machine having simplified structure for accomplishing simultaneous lateral adjustment of the sealing wheels and their associated equipment carried by the platform.

Other objects, features and advantages of this invention will be apparent from the specification, the drawings and the claims.

In the drawings, wherein like numerals indicate like parts:

FIG. 1 is a plan view, with a portion cut away, of an apparatus constructed in accordance with the present invention;

FIG. 2 is a rear elevational view, with portions cut away, of the machine of FIG. 1;

FIG. 3 is a side elevational view of the machine of FIG. 1;

FIG. 4 is a fragmentary view of the machine of FIG. 1 illustrating the manner in which the edge guide is moved to align a sheet of material;

FIG. 5 is a fragmentary front elevational view of the machine of FIG. 1 illustrating the edge guide and the manner in which the lower tape arbor is recessed behind the edge guide.

The machine illustrated in FIGS. 1 through 5 is designed for sealing a sheet of material carried by the machine to another sheet or body of material which is in place on the floor of a large tank, or the like. Specifically, the machine may be used to join sheets of material to a body of material to line the floor of a cryogenic storage tank such as shown in the U.S. Pat. to Smith No. 3,196,622. Due to the size of such tanks, it is preferable that the floor lining be fabricated in place by sealing together Two rubber-tired strips or sheets of lining material until a whole lining has been formed. The machine of the present invention, which is ideally suited for performing this function, includes a platform indicated generally at 10 adapted to travel along a track 11 which may be laid alongside the free edge of the lining which is already in place on the tank floor, and to which it is desired to add an incremental sheet. The track is preferably portable so that it may be moved as each successive sheet is added. Two flanged wheels 12 and 13 retain the platform on the track with the wheel 13 being driven by motor 14 through transmission 15 and drive chain 16 to move the platform horizontally along the track. Two rubber-tired wheels 17 and 18 support the side of platform 10 opposite track 11.

Sealing means are provided on the platform for joining the sheet 29 carried by the platform to the sheet 30. The sheet 30 may be the liner for the floor of the tank, as in the Smith U.S. Pat. No. 3,196,622. The sealing means are preferably provided in the form of lower and upper heat-sealing wheels 19 and 23. Reference is made to U.S. Pat. No. 3,269,884 for a full disclosure of the construction and manner of operation of typ- ical heat-sealing wheels which may be utilized with this invention. The lower heat-sealing wheel 19 is rotatably mounted on the platform 10 by means of a horizontal axle 20, set in bearing mountings 21, 22 and 59 on standards 21a, 22a and 59a. The bearing mountings permit movement of the axle 20 in an axial direction - in this case to either the right or left as viewed in FIG. 2. The lower wheel 19 is powered by motor 64 through transmission 65 and drive chain 66 which engages a sprocket 67 on axle 20. Sprocket 67 engages a splined portion 68 of axle 20 so that axle 20 may move laterally with respect to sprocket 67, while maintaining driving engagement therewith.

A slide 62 is mounted on platform 10 for lateral movement in a direction parallel to the longitudinal axis of axle 20. The slide structure 62 mounts a vertical support 26. The upper heat-sealing wheel 23 is mounted directly above lower heat-sealing wheel 19 on an arm 24 pivotally connected at 25 to vertical support 26 of slide structure 62. The pivotal mounting of arm 24 permits the upper heat-sealing wheel 23 to move vertically toward or away from the lower wheel 19. A cable 27 and crank 28 provide leverage, enabling the platform operator to pivot the upper sealing wheel 23 away from the lower sealing wheel so that the sheets to be sealed may be positioned therebetween at the beginning of operation. When the apparatus is in operation, cable 27 is slack so that the upper wheel 23 will peripherally engage and be supported upon the lower wheel 19. Thus in operation the full weight of both sealing wheels is carried by axle 20 and the bearing mountings 20, 21 and 59. Heat-sealing wheel 23 is an idler and, by resting on the lower wheel 19 during operation, sufficient friction is created for driving the upper wheel 23 off the lower wheel 19.

An arbor 31 is provided for supporting a roll of material to be sealed to material in place. The arbor is carried in part by slide 62 and movable laterally therewith. The arbor 31 is supported at one end by standard 33 carried on slide 62. Suitable bearing mountings in the standard 33 permit the arbor to rotate but not to move laterally with respect to the standard 33. The other end of arbor 31 rests on slide mounting 34 on arm 35 cantilevered from the platform 10. Slide mounting 34 permits the arbor 31 free rotational movement and free lateral movement in the direction of its axis, so that the arbor 31 may move laterally with the slide 62.

Arbor 31 supports a roll of sheet material 32 (shown in FIGS. 3 and 4 but omitted from the other figures for clarity) from which a sheet 29 unrolls to pass between the heat-sealing wheels 19 and 23 and be joined to the sheet 30.

In order to seal the sheets of material 29 and 30 together, it is preferred to lay a strip or tape of like material faced with adhesive above and below the juncture of sheets 29 and 30. Two additional arbors are provided for dispensing these sealing tapes. Tape arbor 38 is carried by pivot arm 24 to cooperate with the upper heat-sealing wheel 23. As shown in FIG. 3, the tape 36 unwinds from a spool 37 on tape arbor 38, travels around the upper heat-sealing wheel, and is sealed to the upper side of sheets 29 and 30 as they pass between the heat-sealing wheels. Tape arbor 38 is movable laterally with slide 62, but during operation its weight, like that of upper heat-sealing wheel 23, is transmitted through the lower sealing wheel to the horizontal axle 20 and bearing mountings 21, 22 and 59.

A second tape arbor 39 is carried on slide 62 and cooperates with the lower heat-sealing wheel 19 to dispense a tape 40 which is sealed to the lower side of sheets 29 and 30. It is preferred that tape arbor 39 be placed on vertical support 26 above the level of sheets 29 and 30. Placing the tape arbor 39 on vertical support 26 spaces it inwardly of the edge of sheet 30 and edge guide 46 so that it will not interfere with the operation of the edge guide 46. Also, it enables the platform operator, who may occupy a seat indicated at 41, to have an unobstructed view of the tape arbor; and it helps balance the load on slide 62.

Rollers 42 and 43, shown in FIG. 3, are provided on slide 62 for guiding the tape 40 from arbor 39 back to the lower heat-sealing wheel 19 where it is sealed to the underside of sheets 29 and 30. The rollers 42 and 43 are preferably placed on a line with the lower heat-sealing wheel 19, and tape arbor 39, which is spaced inwardly from the sealing wheels, is inclined from the vertical, as shown in FIG. 5, so that the tape 40 from arbor 39 may reach roller 43 below the edge of sheet 30.

Tape arbors 38 and 39 are preferably provided with drag means for maintaining tension in the tapes 36 and 40 as the tapes unwind. These means may be provided as shown in FIG. 2 by dual brake shoes 44 and 45 carried by the platform and the tape arbor, respectively, which are kept under compression by coil spring 46 so that drag is exerted on the tape arbor as the shoes move relative to each other, and the sealing tapes 36 and 40 always remain taut.

The sealing operation takes place as follows: As the platform 10 moves along track 11 the sheet of material 29 is unwound from the roll 32 on arbor 31 and passes between the heat-sealing wheels 19 and 23. The sheet 30 external to the platform is raised from the tank floor and passes between the wheels 19 and 23 as the platform moves by. Simultaneously the tapes 36 and 40 unwind from their respective rolls carried on tape arbors 38 and 39, and pass between the sealing wheels on opposite sides of sheets 29 and 30. Heat from the sealing wheels activates a suitable adhesive on tapes 36 and 40 to seal the tapes to the sheets of material, and thus effect sealing of the sheets to each other.

The sheets of material 29 and 30 are preferably held with their edges in parallel relationship and very close to each other as they pass between the sealing wheels. Two adjustment means are provided to assure proper alignment of the sheets 29 and 30. These adjustment means provide for fine adjustment of the external sheet relative to the sealing apparatus, and also for adjustment of the sealing apparatus on the platform relative to the external sheet. The latter adjustment would be most useful where the track 11 is not laid properly parallel to the edge of sheet 30.

The fine adjustment of the external sheet 30 relative to the sealing apparatus is provided by the edge guide means which is adapted to grasp the sheet of material 30 and laterally align it to pass between the sealing wheels as the platform moves along. As shown in FIG. 5, the edge guide means, indicated generally at 46, includes a mounting block 47 which is mounted on vertical support 26 carried by slide 62. Mounting block 47 is adapted for rotation about an axis substantially normal to the rotational axis of arbor 31. Rotation of the mounting block 47 is controlled by the platform operator with hand wheel 47a through gear box 47b. At least two rollers 48 and 49 are mounted on the block 47 and adapted to engage opposite sides of the sheet 30. In the illustrated embodiment, as shown in FIGS. 3 and 4, two pairs of rollers 48, 48a and 49, 49a are employed.

The rollers 48 and 49 are mounted for rotation on an axis substantially parallel to that of arbor 31. The upper roller 48 has a spring 50 urging it toward the roller 49 so as to grasp the sheet 30 between the two rollers. Operation of the edge guide means is illustrated in FIG. 4. As the platform moves along its track, the operator may turn handwheel 47a to rotate mounting block 47 on its axis. As mounting block 47 rotates, the rollers 48 and 49 cut into or out of the sheet 30, thus causing it to move toward or away from the block 47 as it passes between the rollers. This enables the operator to maintain sheet 30 in proper alignment with sheet 29 on the platform. This edge guide means is disclosed in more detail in my co-pending application, Ser. No. 879,199 filed Nov. 24, 1969 for "Sealing Apparatus."

As indicated above, the track 11 when it is laid may not be properly aligned with the edge of sheet 30, so that the platform 10 may, as it travels along the track, move too close or too far away from the sheet 30 for the edge guide 46 to properly align the sheets 29 and 30. It would normally be necessary in this event to suspend operations and re-set the track 11. However, this problem is overcome in the present invention by providing means for simultaneous lateral adjustment of axle 20 and slide 62 toward or away from external sheet 30. Since the sealing wheels and their associated equipment are carried by either axle 20 or slide 62, this accomplishes lateral adjustment of all the necessary sealing equipment relative to the external sheet 30. In this manner, minor errors in track placement may be compensated for by the machine operator without suspending operation.

The mechanism for accomplishing the simultaneous lateral adjustment is shown most clearly in FIG. 2. The platform operator, by turning handwheel 51 in either direction, can impart rotational movement through flexible drive member 52 to worm gear 53. Since cam 54 which rides worm gear 53 is locked against rotation by bar 55, it must move laterally as worm gear 53 is rotated. The direction of movement of cam 54 is, of course, determined by the direction in which worm 53 is rotated by the platform operator. Pin 56 on cam 54 engages a cam follower 57 which is locked on axle 20 with set screw 58. Since the bearing mounts 21, 22 and 59 of axle 20 permit lateral movement of the axle in the direction of its axis, cam follower 57 and axle 20 will move with the pin 56. Lower heat-sealing wheel 19 carried on axle 20 is thus laterally adjustable relative to the platform 10 toward or away from external sheet 30 — the direction and amount of movement depending on the direction and amount which the platform operator rotates handwheel 51.

As shown in FIG. 1, cam follower 57 also engages a pin 60 connected by arm 61 to slide 62 which is mounted on slide bars 63 for lateral movement parallel to the axis of axle 20. Slide 62 will therefore duplicate the lateral movements of axle 20 and lower heat-sealing wheel 19. Slide 62 carries vertical support 26 which mounts the upper heat-sealing wheel 23, the edge guide 46, and both tape arbors 38 and 39. Slide 62 also carries arbor mounting 33 and tape rollers 42 and 43. Thus, with the exception of lower heat-sealing wheel 19, all components of the sealing system are movable laterally with the slide 62. Since axle 20 and slide 62 always move together, upper heat-sealing wheel 23 will always remain directly above the lower heat-sealing wheel 19.

As seen most clearly in FIG. 3, the equipment carried by slide 62 is so arranged as to minimize torque loading on the slide when the apparatus is in operation. Undue torque loading would produce excessive friction between the slide 62 and slide bars 63, making lateral movement of slide 62 difficult. In the present apparatus, torque loading is minimized by having the weight of upper heat-sealing wheel 23 and tape arbor 38 carried by axle 20, by having the roll of sheet material 32 mounted above slide bars 63, and by having the remainder of the equipment on slide 62 distributed so that the resulting center of gravity is approximately over the slide bars 63.

Providing the dual slide structures — axle 20 and slide 62 — for mounting the sealing equipment provides a simplified structure for accomplishing the lateral adjustment of all the sealing equipment. The dual structure provided has less bulk and weight than would a single slide structure large enough to mount the same equipment. This, of course, results in a savings in both manufacturing and operating costs.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:

1. An apparatus for sealing two sheets of material together comprising,
   a powered platform adapted to travel along a track,
   a lower heat-sealing wheel rotatably mounted on said platform by means of a horizontal axle set in bearing mountings on said platform, said mountings permitting the axle to move in an axial direction,
   a slide mounted on said platform for lateral movement in a direction parallel to the axis of said axle,
   an upper heat-sealing wheel positioned above said lower heat-sealing wheel, said upper heat-sealing wheel being pivotally mounted on said slide for movement in a vertical plane toward or away form said lower heat-sealing wheel, said upper heat-sealing wheel peripherally engaging and substantially supported upon said lower heat-sealing wheel when said apparatus is in operation, an arbor carried at least in part by said slide and movable therewith for supporting a roll of sheet material in a position to feed said sheet material between said heat-sealing wheels to be sealed to a sheet of material in place external to said apparatus, at least one tape arbor carried by said slide for supporting a roll of sealing tape in a position to pass between said sealing wheels and be sealed to said sheets of material, means for simultaneous lateral adjustment of said axle and said slide in a direction toward or away from said external sheet, the equipment carried by said slide being so arranged as to minimize torque loading on said slide when said apparatus is in operation.

2. The apparatus according to claim 1 wherein a tape arbor is provided pivotally mounted with said upper heat-sealing wheel so that when said apparatus is in operation the weight of said tape arbor is supported upon said lower heat-sealing wheel.

3. The apparatus according to claim 1 wherein edge-guide means are carried on said slide adapted to grasp said sheet of material external to said apparatus and laterally align said external sheet to pass between said upper and lower heat-sealing wheels and be sealed to the sheet of material on said arbor.

4. The apparatus according to claim 2 wherein two tape arbors are carried on said slide for supporting rolls of sealing tape in a position to pass between said upper and lower sealing wheels and be sealed to opposite sides of said sheets of material, one of said tape arbors being cooperative with said upper heat-sealing wheel so that the tape thereon is sealed to the upper side of said sheets of material, the other of said tape arbors being cooperative with said lower heat-sealing wheel so that the tape thereon is sealed to the lower side of said sheets of material, said arbor which is cooperative with said lower heat-sealing wheel being placed forward of said edge-guide means.

* * * * *